(12) United States Patent
Song et al.

(10) Patent No.: US 6,515,728 B1
(45) Date of Patent: Feb. 4, 2003

(54) MULTI-DOMAIN LIQUID CRYSTAL DISPLAY DEVICE

(75) Inventors: In Duk Song, Kumi (KR); In Jae Chung, Kumi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 58 days.

(21) Appl. No.: 09/657,476

(22) Filed: Sep. 7, 2000

(51) Int. Cl.⁷ .............................................. H02F 1/136
(52) U.S. Cl. ...................................... 349/148; 349/140
(58) Field of Search ................................ 349/144, 142, 349/141, 147, 148, 140, 129

(56) References Cited

U.S. PATENT DOCUMENTS

| | | | | |
|---|---|---|---|---|
| 5,164,851 A | * | 11/1992 | Kanemori et al. | 349/143 |
| 5,179,456 A | * | 1/1993 | Aizawa et al. | 349/129 |
| 5,298,199 A | * | 3/1994 | Hirose et al. | 349/129 |
| 5,757,454 A | * | 5/1998 | Ogishima et al. | 349/129 |
| 5,808,717 A | * | 9/1998 | Van Aerle | 349/129 |
| 5,831,700 A | * | 11/1998 | Li et al. | 349/129 |
| 5,859,682 A | * | 1/1999 | Kim et al. | 349/129 |
| 5,870,075 A | * | 2/1999 | Yamazaki et al. | 349/143 |
| 5,893,622 A | * | 4/1999 | Gold | 349/143 |
| 5,986,733 A | * | 11/1999 | Winker et al. | 349/129 |
| 6,057,905 A | * | 5/2000 | Nakajima | 349/142 |
| 6,100,953 A | * | 8/2000 | Kim et al. | 349/129 |

* cited by examiner

Primary Examiner—James Dudek
(74) Attorney, Agent, or Firm—McKenna Long & Aldridge LLP

(57) ABSTRACT

A multi-domain liquid crystal display device is disclosed. In the device, a first pixel electrode is connected to a drain electrode. A second pixel electrode is formed to surround the periphery of the first pixel electrode. A resistor is formed between the first and second pixel electrodes. Accordingly, a viewing angle and an aperture ratio can be improved.

24 Claims, 5 Drawing Sheets

MULTI-DOMAIN LIQUID CRYSTAL DISPLAY DEVICE

BACKGROUND OF THE INVENTION

1. Field of the Invention

This invention relates to a liquid crystal display, and more particularly to a multi-domain liquid crystal display device that is adapted to improve an aperture ratio and a view angle.

2. Description of the Related Art

Generally, a liquid crystal display (LCD) tends toward wider applications by virtue of its characteristics such as lightweight, thin thickness and low power consumption, etc. Accordingly, the LCD has been used for office automation equipment and video/audio equipment, etc. The LCD controls a transmitted amount of light in response to a data signal applied to a plurality of control switches arranged in a matrix to display a desired picture on a screen.

However, the LCD has drawbacks in that a viewing angle is narrow and that a displayed picture quality is considerably deteriorated when viewed from a side direction thereof. In order to solve these problems, there have been made various studies for assuring a wide viewing angle. Accordingly, a multi-domain method has been suggested as a result of such studies. This multi-domain method uses an orientation control electrode for controlling orientation of liquid crystal cells in a different direction for each sub-pixel area (i.e., domain) for each pixel. Each pixel is divided into at least two sub-pixel areas. Such an orientation control electrode is formed in such a manner to surround the periphery of the pixel electrode to control an electric field applied to the liquid crystal, thereby adjusting an orientation of the liquid crystal in a plurality of orientation directions. A multi-domain LCD device provided with the orientation control electrode will be described below with reference to FIG. 1 and FIG. 2.

FIG. 1 is a plan view showing a structure of a conventional multi-domain LCD device. In FIG. 1, when a scanning signal transmitted from a gate wire 16 is applied to a gate electrode 20, a data signal applied, via a data wire 6, to a source electrode 8 is transmitted to a drain electrode 18. The multi-domain LCD device having the structure as shown in FIG. 1 is provided with an orientation control electrode 14 surrounding the periphery of a pixel electrode 12 so as to implement a multi-domain. A cross-section taken along line A–A' of FIG. 1 will be described in detail in conjunction with FIG. 2.

As shown in FIG. 2, a gate insulator 4, a data wire and a protective film 10 are formed at the upper portion of a first substrate 2. The upper portion of the protective film 10 is provided with the orientation control electrode 14. Since the pixel electrode 12 provided at the protective film 10 is a real areas to which a light beam is transmitted, it consists of a transparent electrode made from a transparent conductive material. The orientation control electrode 14 is supplied with Vcom to control an electric field applied to the liquid crystal, thereby adjusting an orientation of the liquid crystal. Accordingly, the conventional LCD device has the orientation control electrode 14 formed at the periphery of the pixel electrode 12 to implement a multi-domain, thereby widening a view angle. Since it is difficult for the orientation control electrode 14 to provide a uniform orientation direction, a deteriorated viewing angle may be caused. Also, since each pixel is provided with an opaque orientation control electrode 14 at the periphery of the pixel electrode 12, a light-transmitted area of each pixel by an amount of space equal to the area occupied by the control electrode 14. This causes a problem of reducing an aperture ratio of each pixel.

SUMMARY OF THE INVENTION

Accordingly, it is an object of the present invention to provide a multi-domain liquid crystal display device that is capable of improving aperture ratio as well as viewing angle.

In order to achieve these and other objects of the invention, a multi-domain liquid crystal display device according to an embodiment of the present invention includes a first pixel electrode connected to a drain electrode; a second pixel electrode formed to surround the periphery of the first pixel electrode; and a resistor formed between the first and second pixel electrodes.

A multi-domain liquid crystal display device according to another embodiment of the present invention includes a first pixel electrode connected to a drain electrode; a second pixel electrode formed to surround the periphery of the first pixel electrode; and a transparent electrode formed between the first and second pixel electrodes to have a desired resistance value.

A multi-domain liquid crystal display device according to still another embodiment of the present invention includes a first pixel electrode connected to a drain electrode; a second pixel electrode formed to surround the periphery of the first pixel electrode; and a semiconductor layer formed between the first and second pixel electrodes to have a desired resistance value.

BRIEF DESCRIPTION OF THE DRAWINGS

These and other objects of the invention will be apparent from the following detailed description of the embodiments of the present invention with reference to the accompanying drawings, in which.

DETAILED DESCRIPTION OF THE PREFERRED EMBODIMENT

Figure 1:
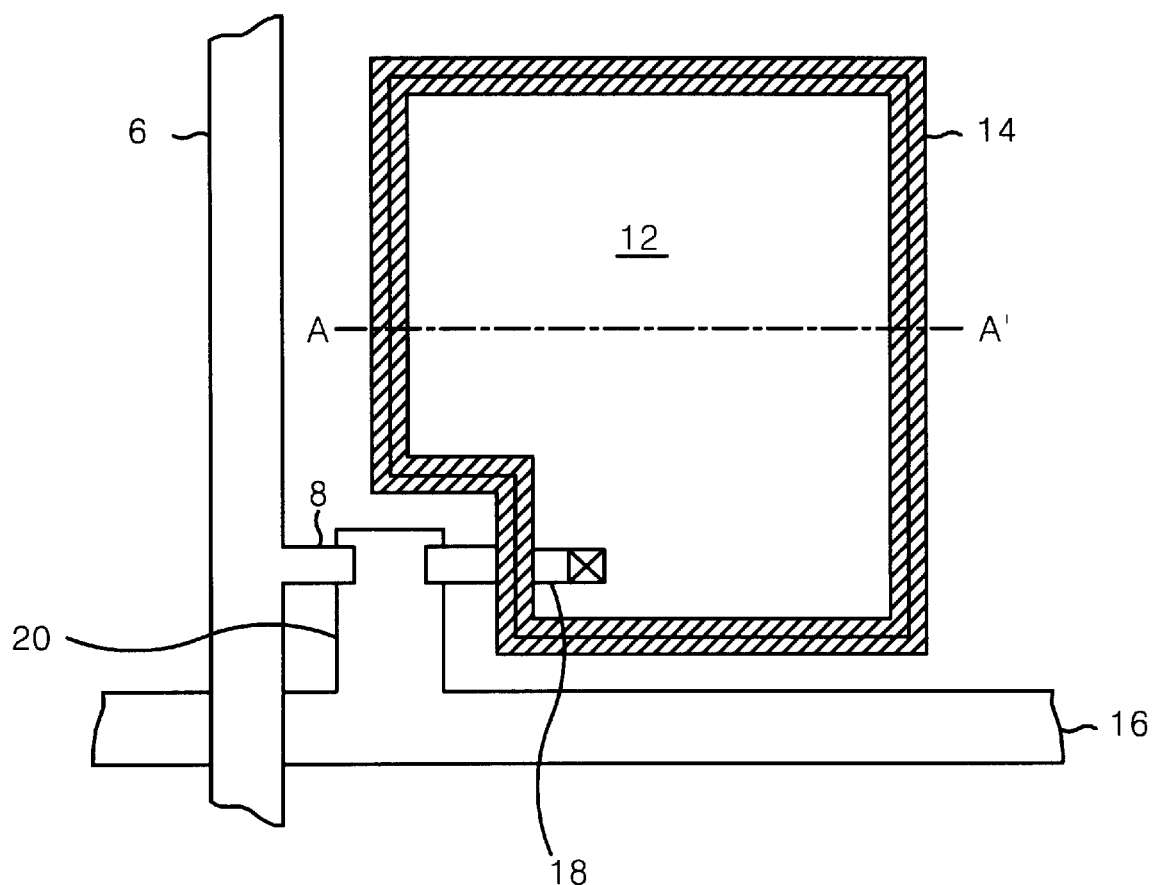
FIG. 1 is a plan view showing a structure of a conventional multi-domain liquid crystal display device.
Figure 2:
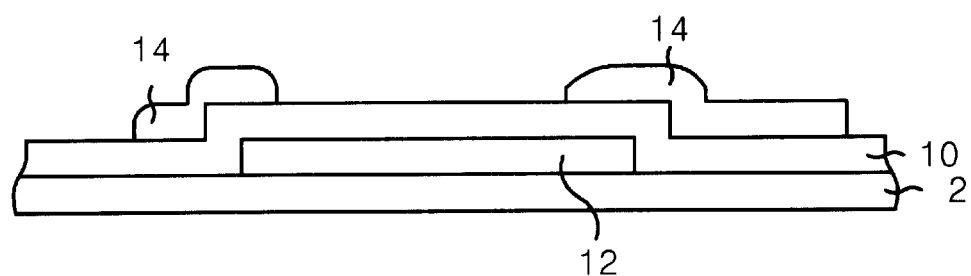
FIG. 2 is a sectional view of the multi-domain liquid crystal display device taken along the A–A' line in FIG. 1.
Figure 3:
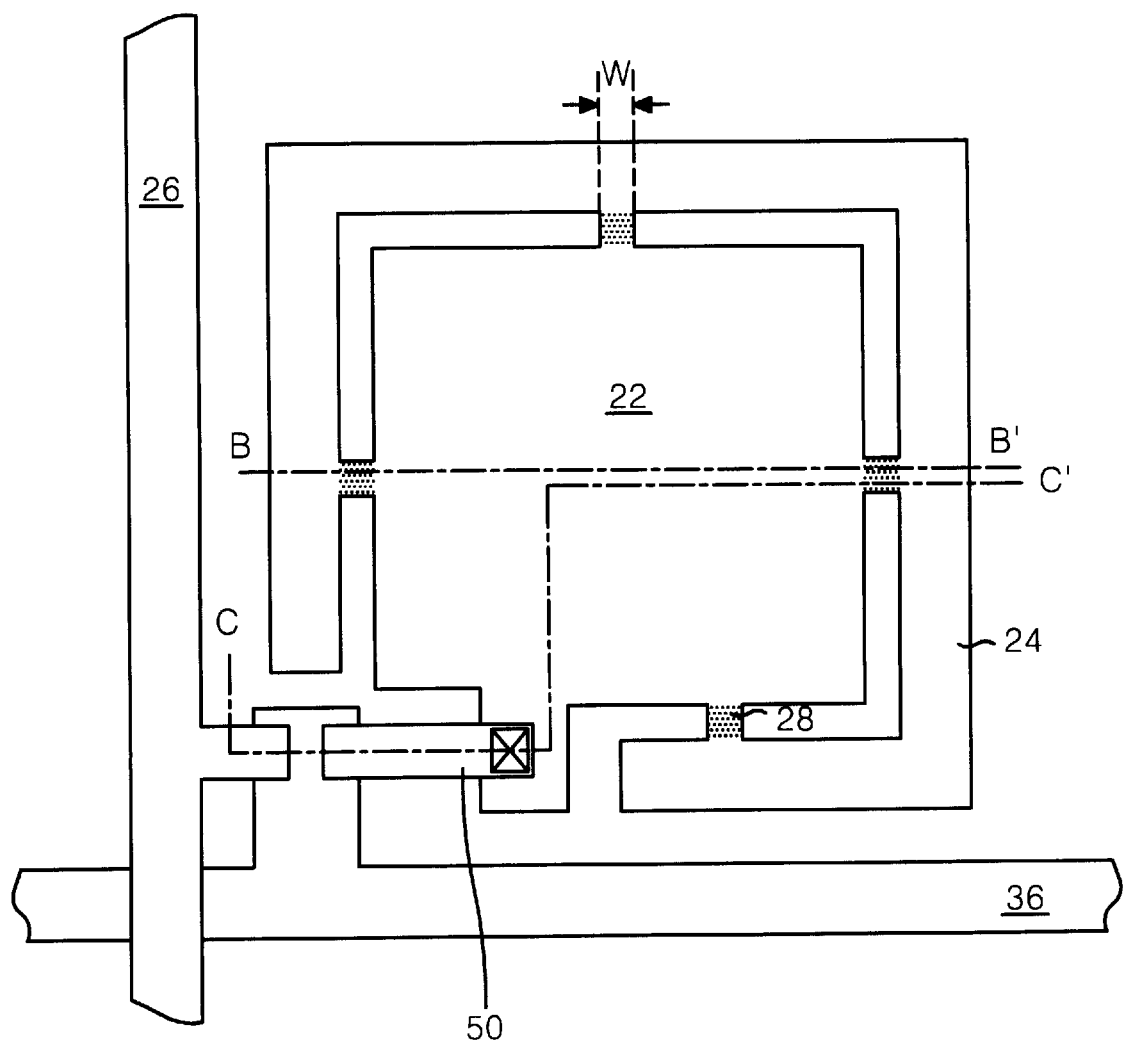
FIG. 3 is a plan view showing a structure of a multi-domain liquid crystal display according to a first embodiment of the present invention.
Figure 4:
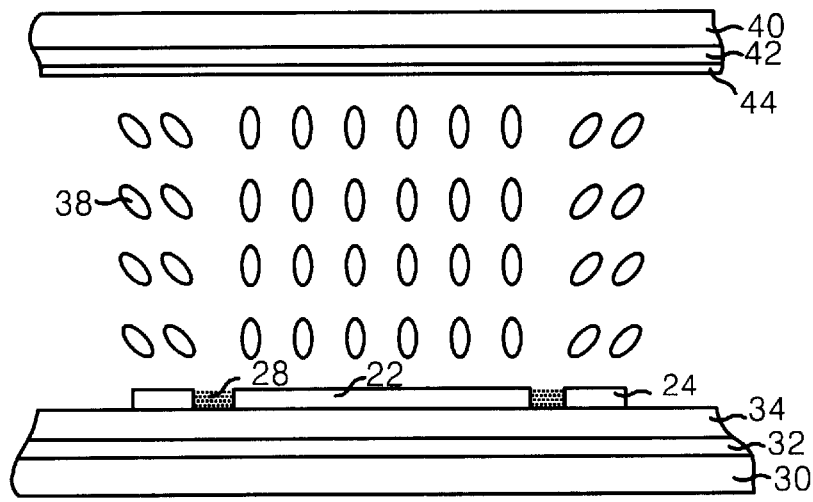
FIG. 4 is a sectional view of the multi-domain liquid crystal display taken along the B–B' line in FIG. 3.

Referring to FIG. 3 and FIG. 4, there is shown a multi-domain liquid crystal display (LCD) device according to a first embodiment of the present invention. The multi-domain LCD device includes first and second substrates 30 and 40; a plurality of data wires 26 and gate wires 36 formed in the vertical and horizontal direction, respectively, to divide the first substrate 30 into a plurality of pixel areas; thin film transistors formed at each pixel area on the first substrate 30 and provided with a gate electrode, a gate insulating film 32, a semiconductor layer, an ohmic contact layer and a source/drain electrode 50; a protective film 34 formed all over the first substrate 30; a first pixel electrode 22 connected to the source/drain electrode 50 on the protective film 34; and a second pixel electrode 24 formed to surround the periphery of the first pixel electrode 22. The second substrate 40 includes a light-shielding layer (i.e., black matrix) (not shown) for shutting off light leaked from the gate wire 36, the data wire 26 and the thin film transistor on the first substrate 30; a color filter layer 42 formed on the light-shielding layer; a common electrode 44 formed on the color filter layer 42; and a liquid crystal layer provided between the first substrate 30 and the second substrate 40. An orientation film may be provided all over the first and second pixel electrodes 22 and 24 and on the common electrode 44. The liquid crystal layer may be constituted by a liquid crystal having a positive or negative dielectric constant anisotropy, or added by a chiral dopant. A negative biaxial film or a negative uniaxial film may be formed at each outer surface of the first and second substrates 30 and 40, or only at any one of the substrates.

When a scanning signal is applied to the gate wire 36, an image signal of the data wire 26 is applied, via the source/drain electrode 50, to the first pixel electrode 22 to drive the liquid crystal with an electric field, and the second pixel electrode 24 drives the liquid crystal with a voltage difference between the second pixel electrode 24 and the first pixel electrode 22, thereby compensating for a retardation (i.e., birefringence) of the liquid crystal according to a viewing angle to realize a wide viewing angle in the LCD device. Accordingly, an orientation of the liquid crystal is controlled in a plurality of directions within one pixel by virtue of the second pixel electrode 24 to widen viewing angle. Also, since the second pixel electrode 24 is transparent, transmissivity of light progressing in a certain pixel increases. Accordingly, the present multi-domain LCD device has an improved aperture ratio.

Figure 5:
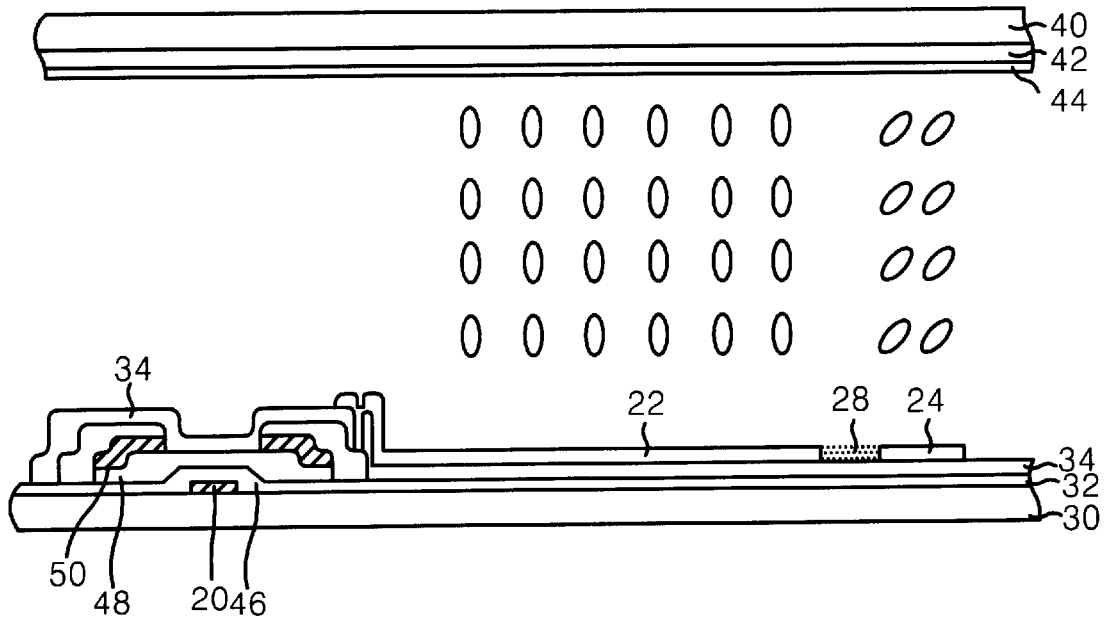
FIG. 5 is a sectional view of the multi-domain liquid crystal display taken along the C–C' line in FIG. 3.

A method of fabricating the present multi-domain LCD device will be described in conjunction with FIG. 5. The gate electrode 20 made from Al, Mo, Cr or their alloy or their double layer is formed on the first substrate 30, and the gate insulator (GI) 32 made from $SiN_x$ or $SiO_x$, etc. is formed on the gate electrode 20. The GI 32 is formed by depositing the $SiN_x$ or $SiO_x$ into a desired thickness (e.g., 2000 to 4000Å) using chemical vapor deposition (CVD). The semiconductor layer 46 is formed on the GI 32 by selectively depositing amorphous silicon (a-Si) using vacuum deposition; depositing n+ a-Si on the semiconductor layer 46; and then patterning the same to form the ohmic contact layer 48. Alternatively, the gate insulator 32, the semiconductor layer 46 and the ohmic contact layer 48 may be provided by forming the gate electrode 20 on the first substrate 30, depositing $SiN_x$ or $SiO_x$, a-Si and n+ a-Si, etc. at the same time to form the gate insulator 32 and then patterning the a-Si and n+ a-Si. Next, the source/drain electrode 50 is formed on the ohmic contact layer 48. The source/drain electrode 50 is formed by depositing a metal (e.g., Cr, Mo or their alloy, or their double layer) in a desired thickness (e.g., 1500Å) using the sputtering method and thereafter etching the same using the photolithography. Subsequently, the protective film (or passivation layer) 34 having a desired thickness is formed on the source/drain electrode 50 and the GI 32. The protective film 34 is formed using an organic material such as benzocyclobutene (BCB) or an inorganic material such as $SiN_x$ or $SiO_x$ in a desired thickness by the spin coating method or the sputtering method. In turn, the pixel electrodes and the resistor are formed on the protective film 34. The first and second pixel electrodes 22 and 24 having a desired thickness (e.g., 1000Å) are formed by the sputtering method. In this case, the first pixel electrode 22 is substantially electrically connected, via a contact hole in the protective film 34, to the source/drain electrode 50. Since the pixel electrodes 22 and 24 is a actual area to which a light beam is transmitted, it includes indium thin oxide (ITO) as a transparent conductive material. The resistor is formed to cause a voltage difference between the first and second pixel electrodes 22 and 24 by forming the first and second pixel electrodes 22 and 24 and depositing the transparent electrode 28 at the same time.

Figure 6:
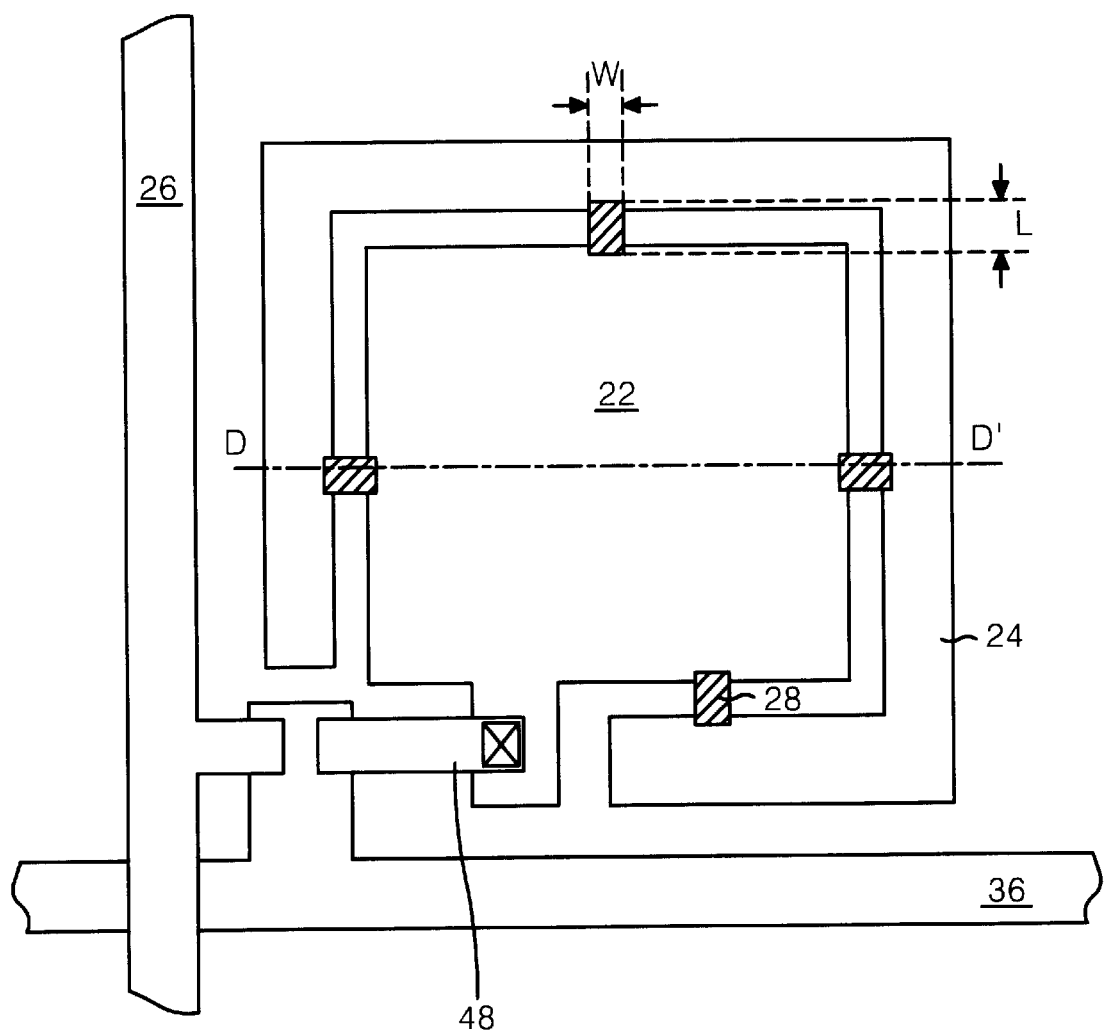
FIG. 6 is a plan view showing a structure of a multi-domain liquid crystal display according to a second embodiment of the present invention.
Figure 7A:
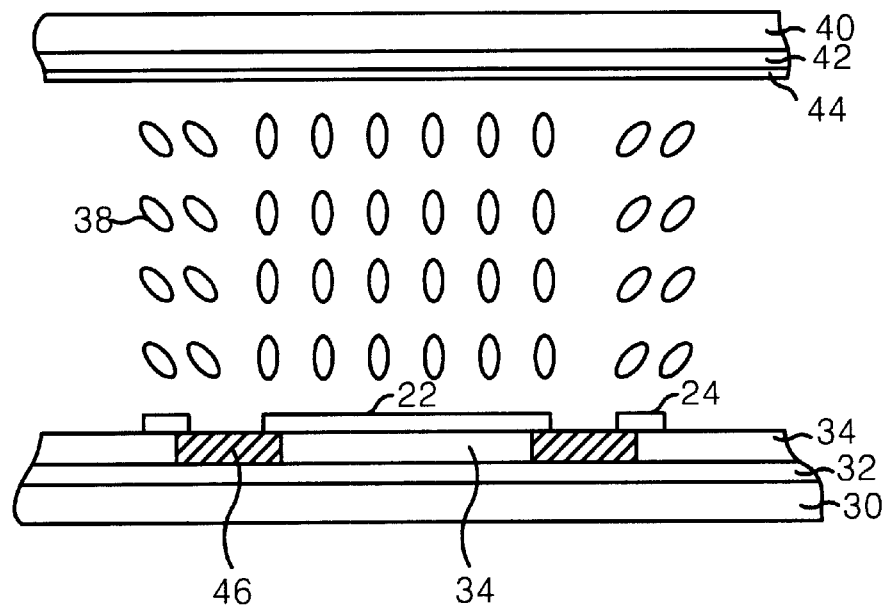
FIGS. 7A and 7B are sectional views of the multi-domain liquid crystal display taken along the D–D' line in FIG. 6.
Figure 7B:
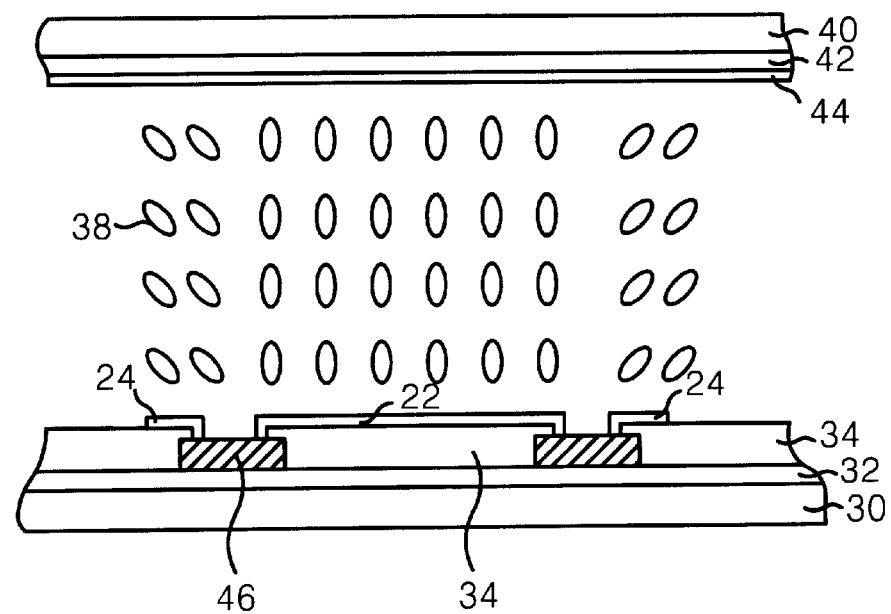

Referring to FIG. 6, there is shown a multi-domain LCD device according to a second embodiment of the present invention. The multi-domain LCD device includes a first pixel electrode 22 connected to a drain electrode 48; a second pixel electrode 24 formed to surround the periphery of the first pixel electrode 22; and a semiconductor layer 46 having a desired resistance value connected to the first and second pixel electrodes 22 and 24. Since the first and second pixel electrodes 22 and 24 in FIG. 6 are identical to those in FIG. 3, a detailed explanation as to them will be omitted. The semiconductor layer 46 provided between the first and second pixel electrodes 22 and 24 are doped with an n-type or p-type impurity to have a desired length L and a desired width W and therefore have a desired resistance value. As shown in FIG. 7A, a contact hole is formed in the protective film 34 and provided with the semiconductor layer 46 to electrically connect the protective film 34 to the semiconductor layer 46 formed at the lower parts or underside of the first and second pixel electrodes 22 and 24. This is represented in more detail by FIG. 7B.

Accordingly, a desired voltage difference is generated between the first pixel electrode 22 and the second pixel electrode 24, so that a driving voltage applied to. the first pixel electrode 22 becomes larger than a driving voltage applied to the second pixel electrode 24. In this case, the width W and length L of the semiconductor layer 46 is adjusted so as to control the voltage difference between the first and second pixel electrodes 22 and 24.

When a scanning signal is applied to the gate wire 36, an image signal from the data wire 26 is applied, via the drain electrode 48, to the first and second pixel electrodes 22 and 24. As shown in FIG. 7A, an orientation of the liquid crystal 38 is set in response to a voltage applied between the pixel electrodes 22 and 24 and the common electrode. Since the orientation of the liquid crystal 38 in this case is identical to that in FIG. 4, a detailed explanation as to it will be omitted. Accordingly, an orientation of the liquid crystal is controlled in a plurality of directions within one pixel by virtue of the second pixel electrode 24 to widen viewing angle. Also, since the second pixel electrode 24 is transparent, transmissivity of light progressing in a certain pixel increases to improve aperture ratio.

As described above, according to the present invention, viewing angle as well as aperture ratio can be improved. Furthermore, the present invention also can realize a wide viewing angle using the existent process and a TN liquid crystal relative to a conventional LCD device using an orientation-divisional structure and a wide viewing angle structure employing a film or using a transverse electric field system and a vertical orientation mode.

Although the present invention has been explained by the embodiments shown in the drawings described above, it should be understood to the ordinary. skilled person in the art that the invention is not limited to the embodiments, but rather that various changes or modifications thereof are possible without departing from the spirit of the invention.

Accordingly, the scope of the invention shall be determined only by the appended claims and their equivalents.

What is claimed is:

1. A multi-domain liquid crystal display device controlling an orientation of a liquid crystal within one pixel in a plurality of directions comprising:
   a first pixel electrode connected to a drain electrode;
   a second pixel electrode formed to surround the periphery of the first pixel electrode; and
   a resistor between the first and second pixel electrodes, wherein a resistance value of the resistor is controlled to adjust a voltage difference between the first pixel electrode and the second pixel electrode.

2. The device according to claim 1, wherein the first and second pixel electrodes are transparent and have a conductive property.

3. A multi-domain liquid crystal display device controlling an orientation of a liquid crystal within one pixel in a plurality of directions comprising:
   a first pixel electrode connected to a drain electrode;
   a second pixel electrode formed to surround the periphery of the first pixel electrode; and
   a transparent electrode formed between the first and second pixel electrodes to have a desired resistance value, wherein a width of the transparent electrode is controlled to adjust a voltage difference between the first pixel electrode and the second pixel electrode.

4. The device according to claim 3, wherein the first and second pixel electrodes are transparent and have a conductive property.

5. A multi-domain liquid crystal display device controlling an orientation of a liquid crystal within one pixel in a plurality of directions comprising:
   a first pixel electrode connected to a drain electrode;
   a second pixel electrode formed to surround the periphery of the first pixel electrode; and
   a semiconductor layer formed between the first and second pixel electrodes to have a desired resistance value, wherein a width and a length of the semiconductor layer is controlled to adjust a voltage difference between the first pixel electrode and the second pixel electrode.

6. The device according to claim 5, wherein the first and second pixel electrodes are transparent and have a conductive property.

7. A multi-domain liquid crystal display device controlling an orientation of a liquid crystal within one pixel in a plurality of directions comprising:
   a gate line and a data line on a first substrate;
   a thin film transistor at a crossing point between the gate line and the data line, the thin film transistor including a gate, a source and a drain electrode;
   a first pixel electrode connected to the drain electrode;
   a second pixel electrode formed to surround the periphery of the first pixel electrode;
   a resistor between the first and second pixel electrodes, wherein a resistance value of the resistor is controlled to adjust a voltage difference between the first pixel electrode and the second pixel electrode; and
   a liquid crystal layer between the first and second substrates.

8. The device according to claim 2, wherein the first and second pixel electrodes are transparent and have a conductive property.

9. The device according to claim 7, wherein the liquid crystal layer includes a positive dielectric anisotropy.

10. The device according to claim 7, wherein the liquid crystal layer includes a negative dielectric anisotropy.

11. The device according to claim 7, wherein the liquid crystal layer includes a chiral dopant.

12. The device according to claim 7, further comprising a negative uniaxial film on at least one of the first and second substrates.

13. The device according to claim 7, further comprising a negative biaxial film on at least one of the first and second substrates.

14. A multi-domain liquid crystal display device comprising:
   a gate line and a data line on a first substrate;
   a thin film transistor at a crossing point between the gate line and the data line, the thin film transistor including a gate, a source, and a drain electrode;
   a first pixel electrode connected to the drain electrode;
   a second pixel electrode connected to the drain electrode;
   a second pixel electrode formed to surround the periphery of the first pixel electrode; and
   a transparent electrode for forming a voltage difference between the first and second pixel electrodes with a desired resistance value to control an orientation of a liquid crystal within one pixel in a plurality of directions; and
   a liquid crystal layer between the first and second substrates.

15. A multi-domain liquid crystal display device comprising:
   a gate line and a data line on a first substrate;
   a thin film transistor at a crossing point between the gate line and the data line, the thin film transistor including a gate, a source, and a drain electrode;
   a first pixel electrode connected to the drain electrodes;
   a second pixel electrode formed to surround the periphery of the first pixel electrode, and
   a semiconductor layer for forming a voltage difference between the first and second pixel electrodes with a desired resistance value to control an orientation of a liquid crystal within one pixel in a plurality of directions; and
   a liquid crystal layer between the first and second substrates.

16. A multi-domain liquid crystal display device, comprising:
   first and second substrates;
   a plurality of data wires and a plurality of gate wires formed perpendicular to one another on the first substrate and defining a plurality of pixel regions;
   a thin film transistor having a source electrode and a drain electrode formed in at least one of the plurality of pixel regions;
   a protective film formed on the entire first substrate;
   a first pixel electrode formed on at least one of the plurality of pixel regions and on the protective film; and
   resistor between the first pixel electrode and the second pixel electrode, wherein a resistance value of the resistor is adjustable.

17. The multi-domain liquid crystal display device of claim 16, further
   comprising an electrically conductive member between the first pixel electrode and the second pixel electrode to electrically connect the first pixel electrode and the second pixel electrode.

18. The multi-domain liquid crystal display device of claim 16, further comprising a transparent electrode between the first pixel electrode and the second pixel electrode.

19. The multi-domain liquid crystal display device of claim 4, wherein the first pixel electrode is connected to the drain of the thin film transistor.

20. The multi-domain liquid crystal display device of claim 16, wherein the first pixel electrode is transparent.

21. The multi-domain liquid crystal display device of claim 16, wherein the second pixel electrode is transparent.

22. The multi-domain liquid crystal display device of claim 16, wherein the first pixel electrode is conductive.

23. The multi-domain liquid crystal display device of claim 16, wherein the second pixel electrode is conductive.

24. A multi-domain liquid crystal display device, comprising:

first and second substrates;

a plurality of data wires and gate wires formed perpendicular to one another to divide the first substrate into a plurality of pixel areas;

a thin film transistor on the first substrate in at least one pixel area, the thin film transistor having a gate electrode, a gate insulating film, a semiconductor layer, an ohmic contact layer, and a source/drain electrode;

a protective film over the first substrate;

a first pixel electrode connected to the source/drain electrode; and a second pixel electrode surrounding a periphery of the first pixel electrode for controlling an orientation of a liquid crystal in a plurality of directions within one pixel by a voltage difference with the first pixel electrode.

* * * * *